US006763141B2

(12) United States Patent
Xu et al.

(10) Patent No.: US 6,763,141 B2
(45) Date of Patent: Jul. 13, 2004

(54) ESTIMATION OF LOCAL DEFOCUS DISTANCE AND GEOMETRIC DISTORTION BASED ON SCANNED IMAGE FEATURES

(75) Inventors: Beilei Xu, Penfield, NY (US); Robert P. Loce, Webster, NY (US)

(73) Assignee: Xerox Corporation, Stamford, CT (US)

( * ) Notice: Subject to any disclaimer, the term of this patent is extended or adjusted under 35 U.S.C. 154(b) by 671 days.

(21) Appl. No.: 09/750,540

(22) Filed: Dec. 28, 2000

(65) Prior Publication Data

US 2002/0085247 A1 Jul. 4, 2002

(51) Int. Cl.[7] .............................. G06K 9/40; G06K 9/48
(52) U.S. Cl. ........................ 382/255; 382/275; 382/199
(58) Field of Search ................................. 382/321–324, 382/289, 290, 275, 255, 218–231, 199; 358/462, 448–466

(56) References Cited

U.S. PATENT DOCUMENTS

| 5,276,530 A | 1/1994 | Siegel |
| 5,307,175 A | 4/1994 | Seachman |
| 5,446,276 A | 8/1995 | Iyoda et al. |
| 5,497,236 A * | 3/1996 | Wolff et al. ................. 358/296 |
| 5,726,775 A | 3/1998 | Walsh |
| 6,014,470 A * | 1/2000 | Matsuda ..................... 382/275 |
| 6,118,484 A * | 9/2000 | Yokota et al. .............. 348/350 |

* cited by examiner

Primary Examiner—Amelia M. Au
Assistant Examiner—Wesley Tucker
(74) Attorney, Agent, or Firm—Fay, Sharpe, Fagan, Minnich & McKee, LLP

(57) ABSTRACT

A method of estimating local defocus distance from a conventionally scanned image is provided. More particularly, the method of estimating defocus distance in a scanned image of a non-planar original object, such as an open book, includes scanning at least a portion of the book in order to produce scanned image data. An image feature obtainable from the scanned image data and a quantitative metric corresponding to the image feature are selected. Image feature data is extracted from the scanned image data and compared to a predetermined calibration relationship between the selected image feature and defocus distance in order to calculate a plurality of defocus distances, which are organized into a defocus distance map. The defocus distance map may be used in the subsequent correction of geometric distortions, blurring defects, and illumination variations adjacent the binding of an open book.

17 Claims, 5 Drawing Sheets

ESTIMATION OF LOCAL DEFOCUS DISTANCE AND GEOMETRIC DISTORTION BASED ON SCANNED IMAGE FEATURES

BACKGROUND OF THE INVENTION

The present invention generally relates to the art of digital imaging. It finds particular application in conjunction with estimating local defocus distance and correcting geometric distortion in a scanned image of a bound book, and will be described with particular reference thereto. It is to be appreciated, however, that the invention will also find application in conjunction with correction of geometric distortions in other three-dimensional objects on a variety of image acquisition and output devices, such as scanners, xerographic copiers and printers.

Optical systems in document scanners, such as a Selfoc® lens scanner or xerographic apparatus, possess a depth of field over which the optical system produces an image that meets resolution and distortion specifications. Conventionally, when a book or other bound, multi-page original is scanned on the scanner, the resulting digital image contains geometric distortions and blurring in the region adjacent the binding. In other words, portions of certain non-planar original objects, such as books, wrinkled sheets, and three-dimensional objects, may lie outside the depth of field of the imaging system. For these originals, the distance between the original object and the scanner platen surface, i.e. the ideal object plane, varies from point to point, which may cause a spatially varying blur in the acquired image. In addition to blurring, geometric distortion and illumination falloff often occur due to the varying defocus distance.

The above geometric distortion problem has been addressed in a variety of ways in the prior art. According to one prior art method, many scans are acquired at fine digital resolutions at a variety of imaging depths. In processing the image, the image values are sub-sampled in order to retain only those samples acquired at the optimal focus. However, this method requires a greater number of scans, more data to be stored in memory, and greater computational complexity.

Another solution to the above problem is to modify the platen to have a sloping edge portion whereby the bound portion of the book is placed in a corner position such that the entire surface of the page being copied is in close contact with the platen surface. This system suffers from a limited magnification range because of restriction on scanned component movement near the sloping corner edge. In addition, operability and production are limited by the inability to perform a "split scan," where both pages of a book are scanned without repositioning.

Another solution to the geometric distortion problem employs an infrared distance sensor to determine the object defocus distance. In this method, the plurality of sensed object defocus distances are used in a subsequent digital restoration algorithm. Another prior art technique uses one or more standard reference targets in order to determine the defocus or degraded states of specific scanner systems. The scanned image is then filtered with a fixed or time-varying image restoration filter, which utilizes correction coefficients pre-selected for the state of defocus or degradation. In addition, profile detectors have been inserted into the scanning system in order to measure the defocus distance of an object by using a reference image plane of the scanning system. The above prior art techniques suffer from the disadvantage of additional required component costs as well as unwanted image processing complexity.

Therefore, a need exists for an accurate method of estimating defocus distance without the use of additional hardware. The present invention contemplates a new and improved method of determining defocus distance, and therefore correcting geometric distortions using a single scanned image of the three-dimensional object acquired in a conventional document scanning manner, which overcomes the above-referenced problems and others.

SUMMARY OF THE INVENTION

In accordance with one aspect of the present invention, a method of determining local defocus distance in a scanned image of a non-planar original object includes scanning at least a portion of the non-planar original object to produce scanned image data. An image feature that is obtainable from the scanned image data and a quantitative metric, which corresponds to the image feature, are selected. A calibration relationship is established between the selected image feature and the defocus distance of the non-planar original object. Image feature data is extracted from the scanned image data and used in the calculation of a plurality of defocus distances from the extracted image feature data. The plurality of defocus distances is organized into a defocus distance map.

In accordance with a more limited aspect of the present invention, edges of text within the scanned image are selected as the image feature and the slope of the edges of text are selected as the corresponding quantitative metric.

In accordance with a more limited aspect of the present invention, the step of calculating a plurality of defocus distances includes calculating slope values for the detected text edges and averaging the calculated slope values along a first direction to generate an average slope value. The plurality of defocus distances are then calculated based upon the average slope values and the calibration relationship.

In accordance with another aspect of the present invention, a digital imaging method for imaging an open book having a book binding includes scanning the open book to produce scanned image data, where the scanned image data contains at least one of geometric distortions and blurring defects adjacent the book binding. Local defocus distances are determined at a plurality of positions adjacent the book binding from at least one image feature obtainable from the scanned image data. The local defocus distances are organized into a defocus map and a distortion map is constructed from the defocus map. The scanned image data is corrected in accordance with the geometric distortion map and outputted onto a physical media.

In accordance with a more limited aspect of the present invention, the step of determining local defocus distance includes selecting an image feature obtainable from the scanned image data and a quantitative metric corresponding to the selected image feature. A calibration relationship is established between the selected image feature and the defocus distance at a plurality of positions across the scanned image. Image feature data is extracted from the scanned image data and used along with the calibration relationship to calculate the local defocus distance at a plurality of positions adjacent the binding of the book.

In accordance with a more limited aspect of the present invention, the selected image feature includes edges of text within the scanned image and the quantitative metric includes a slope of the edges of text within the scanned image.

In accordance with another aspect of the present invention, a xerographic apparatus for reproducing an image representation of a scanned open book includes a planar imaging platen and means for scanning the open book to produce scanned image data, which contains at least one of geometric distortions, blurring defects, and illumination variations adjacent the binding of the book. A processor calculates a defocus distance map from image feature data extracted from the scanned image data by appropriate means. A processor calculates a distortion map from the defocus distance map and an image processor corrects the scanned image data for at least one of the geometric distortions, blurring defects, and illumination variations. The apparatus includes means for transferring an image charge pattern onto a photoreceptor. At least one developing station develops the charge pattern and at least one fuser station fixes the developed image onto a physical media.

In accordance with a more limited aspect of the present invention, the apparatus includes an edge detection processor which detects edges of text within the scanned open book.

In accordance with a more limited aspect of the present invention, the processor for calculating the defocus distance map includes means for calculating a slope corresponding to each detected text edge and means for calculating an average slope from each calculated slope along a direction parallel to the binding of the book. The processor further includes means for accessing a predetermined calibration relationship between slopes of text edges and corresponding defocus distances and means for calculating a defocus distance from the average slope and the predetermined calibration relationship.

One advantage of the present invention resides in determining defocus distance from a single scanned image of a three-dimensional object.

Another advantage of the present invention resides in the determination of local defocus distance using reference features within a scanned image.

Another advantage of the present invention resides in improved scanning of a bound object without geometric distortion and blurring adjacent the binding.

Still other benefits and advantages of the present invention will become apparent to those skilled in the art upon a reading and understanding of the preferred embodiments.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Figure 1:
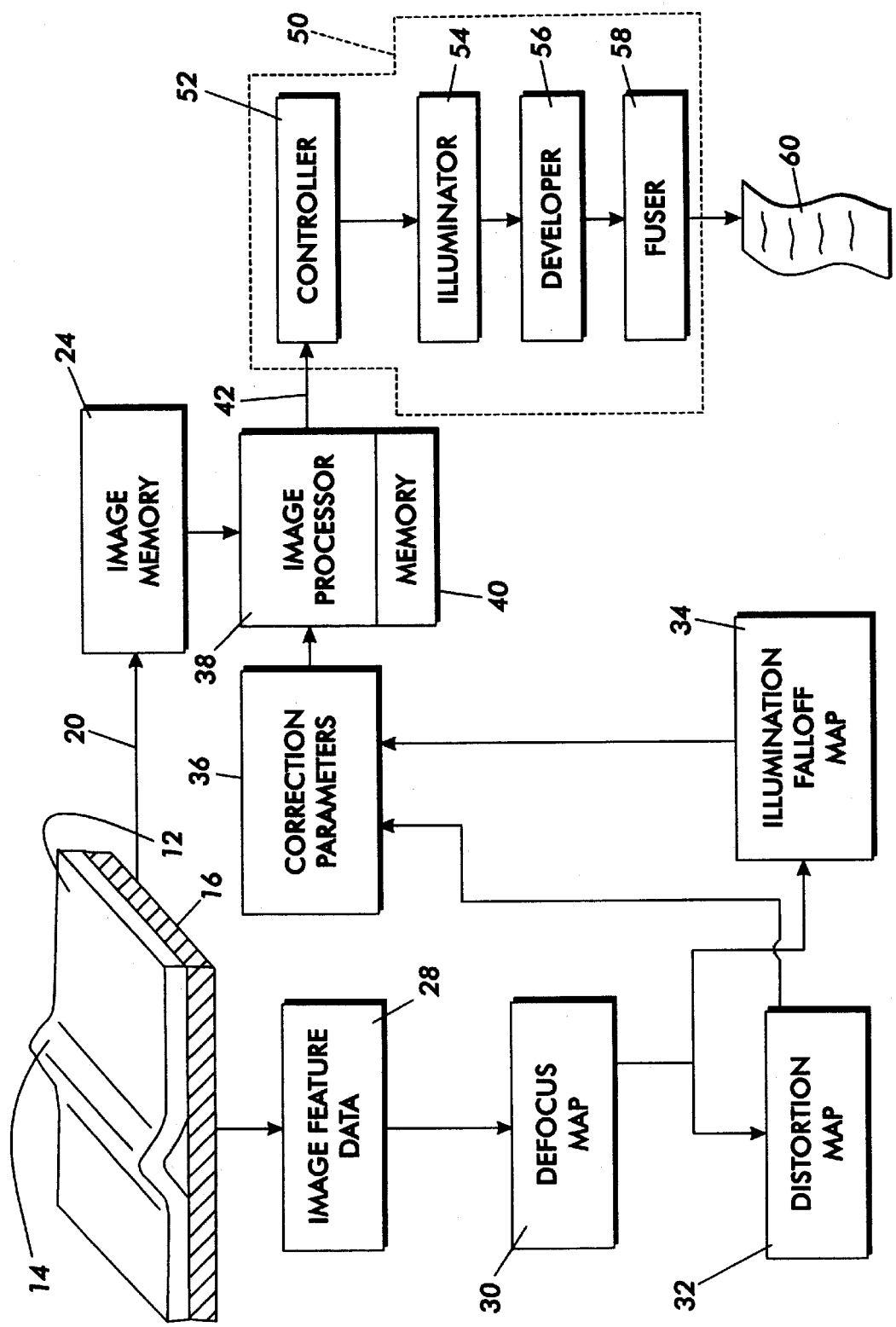
FIG. 1 is a functional block diagram of an imaging apparatus suitable to practice an embodiment of the present invention.

With reference to FIG. 1, an imaging apparatus is illustrated which determines local defocus distance in order to correct geometric distortions and blurring caused by height non-uniformities in the original object 12 to be scanned. More particularly, an object 12, such as an open book or other bound material, having a binding 14, is placed in a face-down position on a flat scanning platen 16, as shown in FIG. 1. The original object 12 is scanned in a conventional manner, producing electrical scanned image data 20, which is stored in an image data memory 24. While the present invention is being described in terms of an open-book scan, it is to be appreciated that it is applicable to scans of other three-dimensional objects having height variations which cause geometric distortions, such as pill bottles, coins, jewelry, and circuit boards.

As is explained more fully below, an image feature, such as edges of text, is selected and used to calculate a map of the local defocus distances present in the scanned image. Selected image feature data is extracted from the scanned image and stored in an image feature data memory 28. The image feature data is used to calculate a defocus map 30, which in turn is used to calculate at least one of a distortion map 32 and an illumination falloff map 34. From the distortion and illumination falloff maps, a plurality of correction parameters 36 are calculated. In a preferred embodiment, the correction parameters are calculated based on image feature data extracted from the entire scanned image. Alternatively, the correction parameters, both geometric distortion and illumination falloff, are calculated based on image feature data from a partial scan of the original, such as a single line at a time. An image processor 38, containing a memory 40, receives the calculated correction parameters and applies them to the scanned image data 20 stored in the image memory 24. The correction parameters are provided on a pixel-by-pixel basis, rendering a compensated digital image representation 42. The compensated digital image representation is output to one of a plurality of image output devices, such as a xerographic printer 50. In this embodiment, the compensated digital image representation 42 is transferred to an image processing controller 52. The controller 52 communicates the compensated image data to the remainder of the printing machine, including an illuminator 54, which transfers a physical image onto a photosensitive surface, at least one developer station 56, and a fuser station 58 producing a geometric distortion-corrected hard copy 60 of the scanned image. Alternatively, the corrected digital image representation is output to a computer or network.

More particularly, in the practice of conventional xerography, it is the general procedure to form electrostatic latent images on a xerographic surface by first uniformly charging a charge retentive surface, such as a photoreceptor. The charged area is selectively dissipated in accordance with a pattern of activating radiation corresponding to original images. The selective dissipation of the charge leaves a latent charge pattern on the imaging surface corresponding to the areas not exposed by radiation.

The charge pattern is made visible by developing it with toner by passing the photoreceptor past at least one developer housing 56. The toner is generally a colored powder, which adheres to the charge pattern by electrostatic attraction. The developed image is then fixed to the imaging surface or is transferred to a receiving substrate such as plain paper or other physical media to which it is fixed by suitable fusing 58 techniques.

Figure 2:
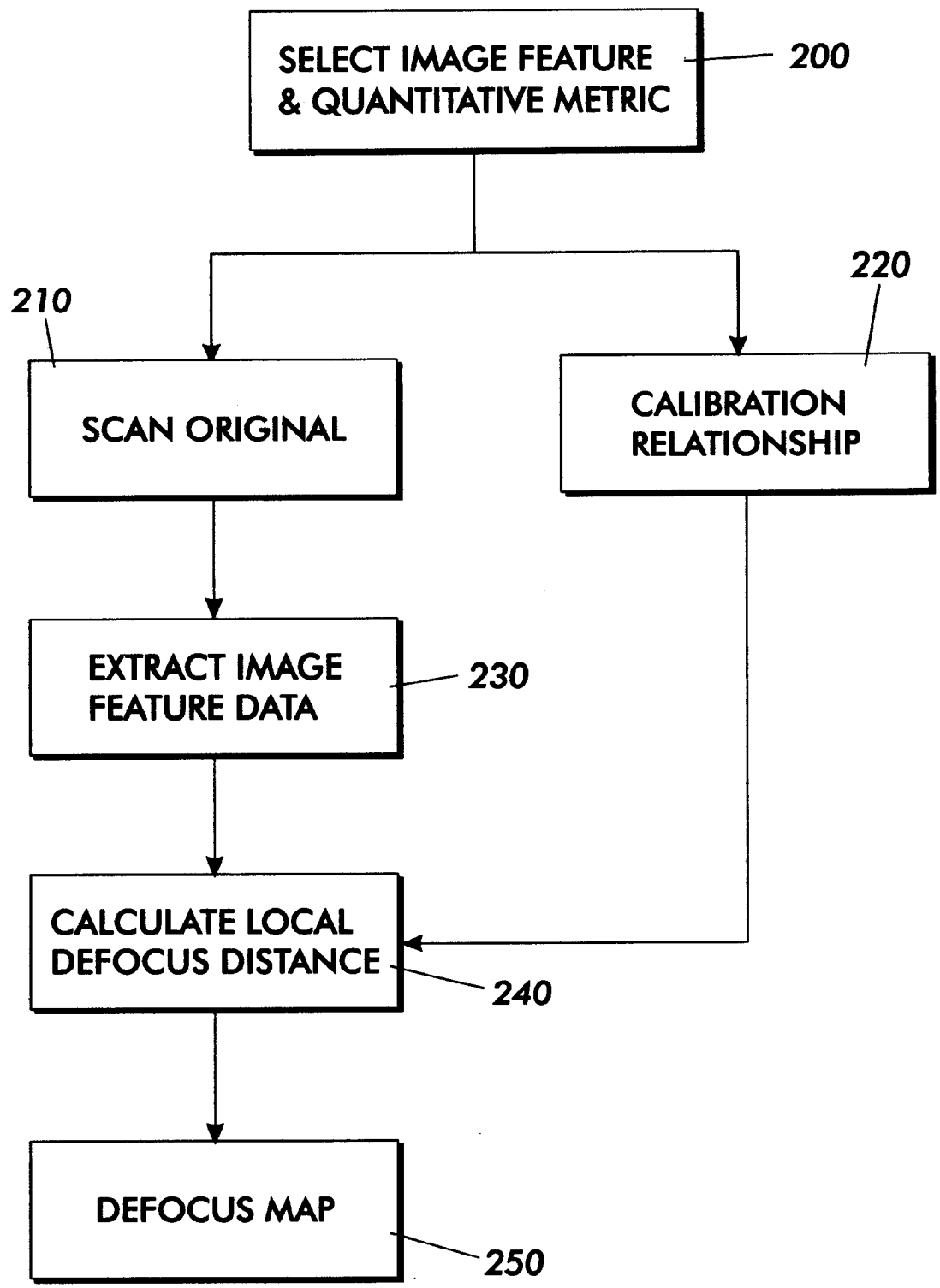
FIG. 2 is a flow chart illustrating one embodiment of the method of determining defocus distance in accordance with the present invention.

With reference to FIG. 2 and continuing reference to FIG. 1, a method of determining local defocus distance using reference features within a scanned image is provided. An original document, such as an open book or other bound material, is scanned 210 in a face-down position.

Preferably, the entire original image is scanned, generating a complete set of scanned image data. However, it is to be appreciated that individual scan lines may be acquired and used for a line-by-line determination of local defocus distance.

From the scanned image, at least one image feature is selected 200, where the image feature is readily obtainable from the scanned image data. In addition, a quantitative metric or attribute corresponding to the selected image feature is also selected 200. Preferably, in dealing with book copying, the edges of text within the scanned image serve as a useful image feature. It is to be appreciated that in book copying, the defocus due to the book binding tends to occur in a fixed orientation along the fast scan or slow scan direction of the document scanner. Accordingly, blurring and geometric distortion effects occur around and adjacent the book binding. More particularly, the selection of an image feature depends on image content, noise properties, process complexity, and speed. However, the most important consideration in selecting 200 an image feature and its corresponding quantitative metric is sensitivity to the blurring defect and the existence of a monotonic relationship with the defocus distance. For example, in an image containing a sufficient number of edges, such as a text image, it is preferable to use the edges as the selected image feature. In dealing with edges of text as the selected image feature, a number of different quantitative metrics may be used to characterize the edges. Such quantitative metrics include edge slope, edge width, and the shape. In a preferred embodiment, the slope of the text edges is used as the quantitative metric. Artisans will appreciate that as the defocus distance increases, the blurring effect increases, and the slope of the edges of text decreases.

Upon selecting an image feature and corresponding quantitative metric, a one-to-one calibration relationship is established 220 between quantitative measures, e.g. slope, of the image feature, e.g. text edges, and the defocus distance. A variety of techniques may be employed in order to establish the relationship between the defocus distance and the selected image feature. In one embodiment, during the scanner manufacturing process, a test target containing objects with sharp edges may be scanned at a plurality of defocus distances. Preferably, the range of defocus distances is large enough to include all possible defocus distances that may arise in practice. However, it is to be appreciated that it is not necessary to make measurements at every single defocus distance within the range of interest. More particularly, the choices involving the number of points to be measured depend on blurring characteristics inherent in the scanner. For example, if the blurring effect associated with a particular scanner is a smooth function of the defocus distance, only a few points need to be measured. In this instance, other points falling in between are mathematically interrelated.

Figure 3:
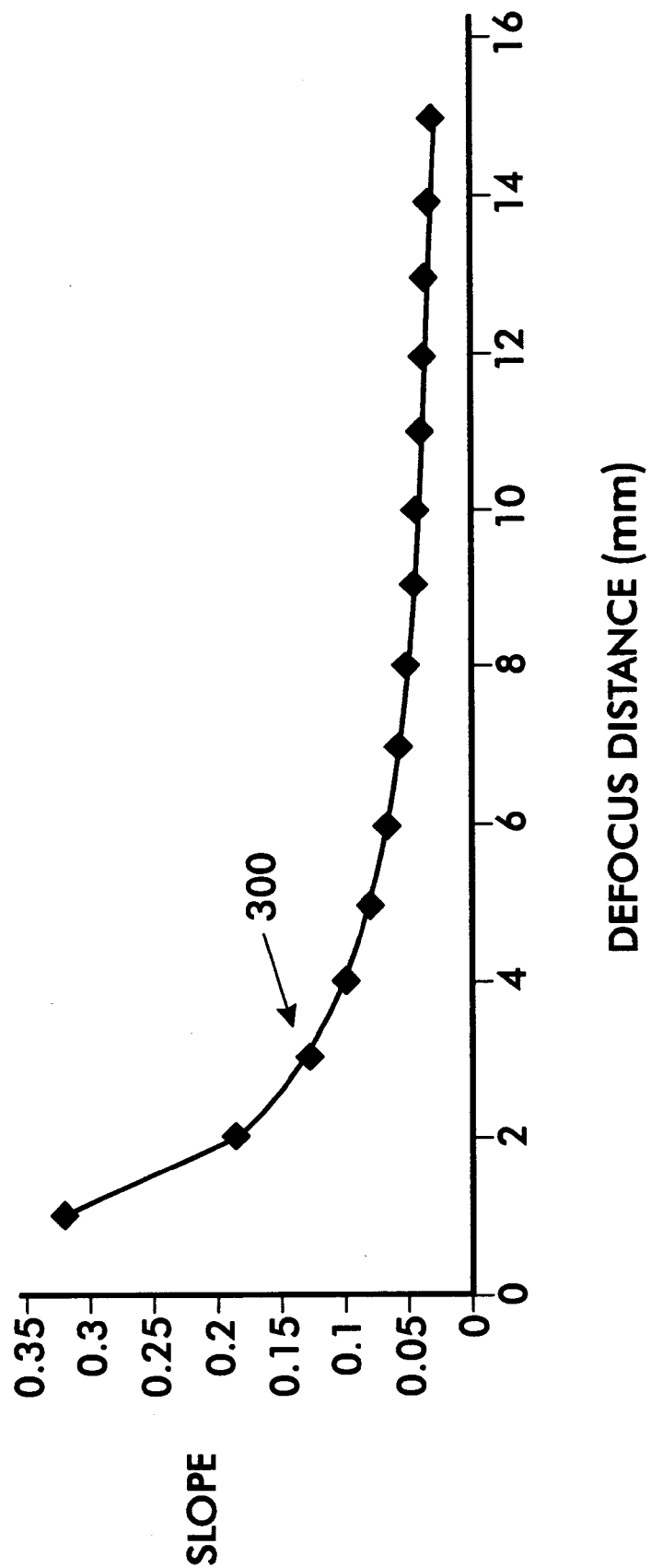
FIG. 3 is an exemplary calibration relationship illustrating a functional relationship between slope of text edges and defocus distance in accordance with the present invention.

During the calibration process, at a particular defocus distance, the slope of a text edge is calculated and stored in the scanner memory along with the corresponding defocus distance, rendering a calibration relationship. In another embodiment, if the blurring characteristics at each defocus distance are known analytically, the corresponding slope at each defocus distance is calculated mathematically without any measurement. Once a relationship is established between the quantitative metric of the image feature and a defocus distance, this relationship is then used to determine the defocus distance across the scanned image according to the magnitude of the slopes of text edges within the image. FIG. 3 provides an exemplary plot of such a calibration relationship 300 relating the slope of text edges to the local defocus distance. It is to be appreciated that the magnitude of the slope has a smooth and monotonic relationship with the defocus distance. In one embodiment, this calibration relationship is stored as a functional relationship. Alternatively, the calibration relationship is stored in the form of a look-up table, which translates slopes of text edges to defocus distance.

From the scanned image data, image feature data for the selected image feature and corresponding quantitative metric is extracted 230 at many points across the field of the scanned image. In a preferred embodiment, text edges are detected and text edge data is extracted using one of a variety of conventional edge detection algorithms. It is preferred to use an edge detection algorithm that is robust against noise in order to reduce the number of false edges that are detected. In one embodiment, a two-dimensional Laplacian filter is employed to detect the text edges. The slope, or other selected quantitative metric, is calculated in the region about each text edge.

Using the predetermined calibration relationship between the quantitative metric of the image feature and the defocus distance, local defocus distances at various points within the scanned image are calculated 240. Preferably, the various calculated slope values are averaged along the direction of the binding, yielding an average slope value for that pixel orientation in a direction perpendicular to the binding. From the average slope values at each pixel orientation perpendicular to the binding, a corresponding defocus value is calculated 240 based on the calibration relationship.

Figure 4:
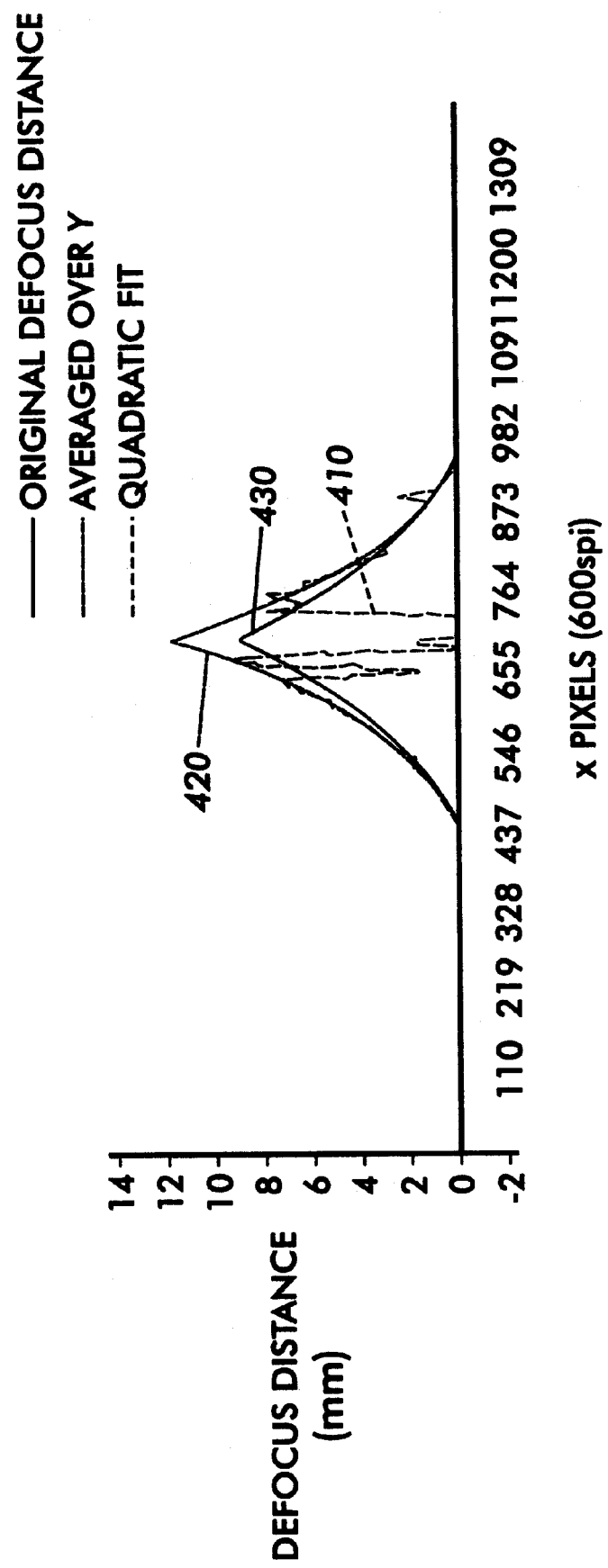
FIG. 4 is a portion of an exemplary defocus distance map calculated in accordance with the present invention.

From the various local defocus distances at various points across the scanned image, an estimated defocus distance map may be generated 250, where the image intensity represents the defocus distance at the corresponding points within the defocus map. In the book-copying embodiment, the defocus distance map may be refined using information from the book binding orientation. More particularly, the defocus distance map is examined in order to determine an orientation of the defocus due to the book binding. Once the orientation is established, the defocus map is smoothed along the direction of the binding or made to fit an approximation of a typical binding shape. Such a smoothing operation is illustrated in FIG. 4. In FIG. 4, the dashed line 410 illustrates the estimated defocus distance that has been averaged along the book binding direction, while the dotted line 420 illustrates fitting the dashed line with a quadratic function. It is to be appreciated that where edge information is available in the image, the distances agree reasonably well with the simulated defocus distance, which is illustrated using the solid line 430.

Figure 5:
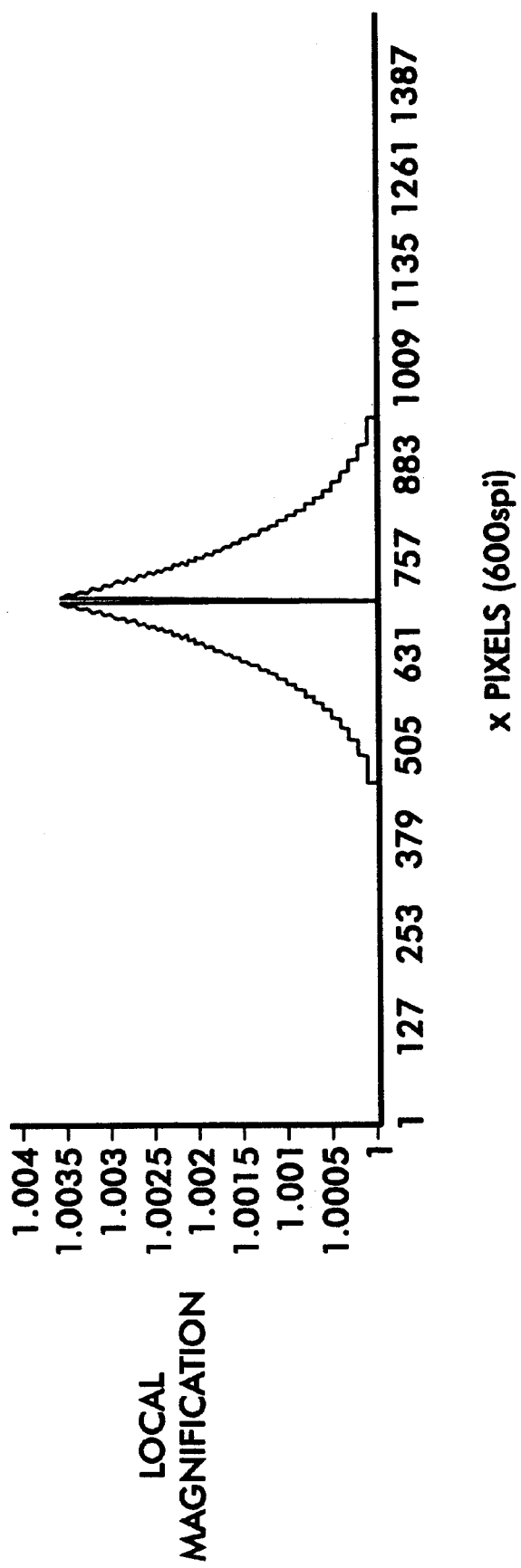
FIG. 5 is a portion of an exemplary distortion map calculated from the defocus distance map illustrated in FIG. 4.

With reference again to FIGS. 1 and 2, the method illustrated in FIG. 2 provides accurate estimates of local defocus parameters from a conventionally scanned image. The defocus parameters may then be used in subsequent corrections of image defects, such as geometric distortion, blurring, and illumination falloff, adjacent the binding of the book. In one embodiment, a distortion processor 32 computes a distortion map from the data contained within the defocus map 30. More particularly, geometric distortion is computed from the rate of change, i.e. the first derivative, of the defocus distance estimate illustrated in FIG. 4. It is to be appreciated that the geometric distortion is a local magnification error. FIG. 5 illustrates an exemplary geometric distortion map, which was computed from the defocus map of FIG. 4. In the case of book scanning, the magnification error occurs in one dimension, i.e. the dimension perpendicular to the binding of the book.

In addition, the defocus distances within the defocus map 30 and the slope of the defocus distances are used to calculate a lightness or illumination falloff map 34. In one embodiment, illumination falloff calculations are based on a predetermined illumination versus defocus distance calibration curve or look-up table.

Defocus calibration data may also be used in conjunction with an adaptive sharpening filter, such as a Windowed Wiener Filter, in order to correct for blur within the image data. Preferably, the sharpening filters are applied on a pixel-by-pixel basis. More particularly, blurring is reduced through an edge enhancement process in which the slopes of the various edges are normalized, thus sharpening the resultant image. In one embodiment, the sharpening filters are pre-designed, with filter selection occurring from the predetermined set. In another embodiment, the filters are designed adaptively in real-time based on the calculated defocus values.

In one embodiment, a plurality of correction parameters are calculated 36 from the distortion 32 and illumination falloff maps 34. These correction parameters are communicated to the image processor 38 for correction of the scanned image data by way of a digital restoration process in which conventional warping techniques are applied on a pixel-by-pixel basis. Alternatively, the calculated defocus distances may be applied to an adaptive optical refocusing system in which blurring defects are eliminated. Subsequently, the distortion and lightness variations are corrected using the digital restoration method described above.

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A method of determining local defocus distance in a scanned image of a non-planar original object, said method comprising:
   scanning at least a portion of the non-planar original object to produce a scanned image data;
   selecting (i) edges of text within the scanned image as an image feature obtainable from the scanned image data, and (ii) a slope of the edges of text as a quantitative metric corresponding to the selected image feature;
   establishing a calibration relationship between the selected image feature and a defocus distance of the non-planar original object;
   extracting image feature data from the scanned image data; and
   calculating a plurality of defocus distances from the extracted image feature data.

2. The method as set forth in claim 1 further comprising:
   organizing the plurality of defocus distances into a defocus distance map.

3. The method as set forth in claim 1, wherein the step of extracting an image feature includes:
   detecting the edges of text using an edge detecting algorithm.

4. The method as set forth in claim 3, wherein the edges of text are detected using a two-dimensional Laplacian filter.

5. The method as set forth in claim 3, wherein the step of establishing a calibration relationship includes:
   at least one of (i) generating a look-up table based on known defocus distances and known slope values for edges of text, and (ii) generating a monotonic functional relationship between known defocus distances and known slope values for edges of text.

6. The method as set forth in claim 5, wherein the step of calculating a plurality of defocus distances includes:
   calculating slope values for the detected text edges;
   averaging the calculated slope values along a first direction to generate an average slope value; and
   computing the defocus distance from the average slope value and the calibration relationship.

7. The method as set forth in claim 6, wherein the step of organizing the plurality of defocus distances into a defocus distance map includes:
   smoothing the defocus distance map along the first direction; and
   fitting the smoothed defocus distance map with a quadratic function.

8. A digital imaging method for imaging an open book having a book binding, said method comprising:
   scanning the open book to produce scanned image data, said scanned image data containing at least one of geometric distortions and blurring defects adjacent the book binding;
   determining local defocus distances at a plurality of positions adjacent the book binding, said defocus distance being determined from at least one image feature obtainable from the scanned image data;
   organizing the determined local defocus distances into a defocus map;
   constructing a geometric distortion map from the defocus map;
   correcting the scanned image data in accordance with the geometric distortion map; and
   outputting the corrected image data onto a physical media.

9. The method as set forth in claim 8, wherein the step of determining local defocus distance includes:
   selecting an image feature obtainable from the scanned image data and a quantitative metric corresponding to the selected image feature;
   establishing a calibration relationship between the selected image feature an the defocus distance at a plurality of positions across the scanned image;
   extracting image feature data from the scanned image data; and from the calibration relationship and the extracted image feature data, calculating the local defocus distance at a plurality of positions adjacent the book binding.

10. The method as set forth in claim 9, wherein (i) the selected image feature includes edges of text within the scanned image; and (ii) the quantitative metric includes a slope of the edges of text within the scanned image.

11. The method as set forth in claim 10, wherein the step of extracting image feature data includes:
    detecting the edges of text using an edge detecting algorithm.

12. The method as set forth in claim 11, wherein the edges of text are extracted using a two-dimensional Laplacian filter.

13. The method as set forth in claim 12, wherein the step of establishing calibration relationship includes:
    at least one of (i) generating a look-up table containing known defocus distances and known slope values for edges of text, and (ii) generating a monotonic functional relationship between known defocus distances and known slope values for edges of text.

14. The method as set forth in claim 11, wherein the step of determining local defocus distance further includes:

calculating slope values corresponding to the detected edges; and averaging the calculated slope values along a direction parallel to the book binding.

15. A xerographic apparatus for reproducing an image representation of a scanned open book, said apparatus comprising:

a planar imaging platen;

means for scanning the open book placed on the platen to produce scanned image data, said scanned image data containing at least one of geometric distortions, blurring defects and illumination variations adjacent a binding of the book;

means for extracting image feature data from the scanned image data;

a processor for calculating a defocus distance map from the extracted image feature data;

a processor for calculating a geometric distortion map from the defocus distance map;

an image processor for correcting the scanned image data in accordance with the geometric distortion map for at least one of the geometric distortions, blurring defects and illumination variations;

means for transferring an image charge pattern onto a photoreceptor;

at least one developing station for developing the charge pattern; and at least one fuser station for fixing a developed image onto a physical media.

16. The xerographic apparatus as set forth in claim 15, wherein means for extracting image feature data from the scanned image data includes:

an edge detection processor which detects edges of text within the scanned book.

17. The xerographic apparatus as set forth in claim 16, wherein the processor for calculating the defocus distance map includes:

means for calculating a slope corresponding to each detected text edge;

means for calculating an average slope from each calculated slope along a direction parallel to the bonding of the book;

means for accessing a predetermined calibration relationship between slopes of text edges and corresponding defocus distances; and means for calculating a defocus distance from the average slope and the predetermined calibration relationship.

* * * * *